US012145431B2

United States Patent
Wassmur (10) Patent No.: US 12,145,431 B2
(45) Date of Patent: Nov. 19, 2024

(54) PYROTECHNIC BRACKETS FOR ELECTRIC VEHICLE

(71) Applicant: Polestar Performance AB, Gothenburg (SE)

(72) Inventor: Robert Wassmur, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 356 days.

(21) Appl. No.: 17/534,154

(22) Filed: Nov. 23, 2021

(65) Prior Publication Data

US 2023/0158877 A1   May 25, 2023

(51) Int. Cl.
| | |
|---|---|
| B60K 1/04 | (2019.01) |
| B60R 21/01 | (2006.01) |
| B60R 21/0132 | (2006.01) |
| H01M 50/249 | (2021.01) |

(52) U.S. Cl.
CPC ............ B60K 1/04 (2013.01); B60R 21/0132 (2013.01); H01M 50/249 (2021.01); *B60K 2001/0438* (2013.01); *B60K 2001/0466* (2013.01); *B60R 2021/01013* (2013.01); *B60R 2021/01252* (2013.01); *H01M 2220/20* (2013.01)

(58) Field of Classification Search
CPC .............. B60K 1/04; B60K 2001/0438; B60K 2001/0466; H01M 50/249; H01M 2220/20; B60R 21/0132; B60R 2021/01013; B60R 2021/01252
See application file for complete search history.

(56) References Cited

U.S. PATENT DOCUMENTS

| | | | |
|---|---|---|---|
| 8,532,881 B2* | 9/2013 | Ostling | |
| 2015/0255975 A1 | 9/2015 | Siciak et al. | |
| 2018/0147941 A1 | 5/2018 | Kube | |
| 2018/0159110 A1* | 6/2018 | Tuomola | |
| 2020/0286703 A1 | 9/2020 | Tazarine et al. | |

FOREIGN PATENT DOCUMENTS

DE      102019220626 A1 *   7/2021

OTHER PUBLICATIONS

Translation of DE-102019220626-A1 relied upon by the office action. (Year: 2021).*
PCT/EP2022/082917, "International Preliminary Report on Patentability", Jun. 6, 2024, 7 pages.
PCT/EP2022/082917, "International Search Report and Written Opinion", Apr. 12, 2023, 9 pages.

* cited by examiner

*Primary Examiner* — James A Shriver, II
*Assistant Examiner* — Nicholas R. Kandas
(74) *Attorney, Agent, or Firm* — Kilpatrick Townsend & Stockton LLP (57) ABSTRACT

An electric vehicle battery pack release system configured to cause a physical separation of a battery pack from an electric vehicle on to which the battery pack is mounted, including one or more pyrotechnic bracket assembly configured to operably couple a battery pack to an electric vehicle, one or more sensor configured to sense a state of the electric vehicle, and an electronic control unit configured to receive data from the one or more sensors and to trigger an explosion in the one or more pyrotechnic bracket assemblies to affect the physical separation of the battery pack from the electric vehicle.

18 Claims, 4 Drawing Sheets

PYROTECHNIC BRACKETS FOR ELECTRIC VEHICLE

TECHNICAL FIELD

The present disclosure relates generally to batteries for electric vehicles, and more particularly to mechanisms for physically separating a high-voltage battery system from an electric vehicle in the event of a catastrophic event.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack.

Most rechargeable battery packs are made up of one or more battery modules, each module containing a plurality of battery cells. In many cases, the rechargeable battery packs are enclosed in a rigid enclosure or housing that is assembled to the vehicle body. For example, the rechargeable battery pack may be assembled to the vehicle body at a location that is spaced from the front, rear and sides of the vehicle, often below the passenger compartment.

As is well known electric vehicle battery packs generate heat in use, which is actively managed by battery cooling systems incorporated into the vehicle structure. In rare circumstances, particularly when subjected to damage from a collision, individual battery cells within the battery pack can overheat. In extreme circumstances, the propagation of heat from the cell experiencing a thermal event can transfer to adjacent cells thereby raising the temperature of the adjacent cells to a point the propagation of the thermal event throughout the entire battery pack (sometimes referred to as a "thermal runaway"), thus destroying the entire battery pack and potentially the electric vehicle.

Thus, although safety of the occupants of the vehicle during a crash remains the highest priority, efforts have also been made to protect the battery pack from damage in a collision. Some approaches to protecting the battery pack include adding structural supporting beams and cross members within the battery enclosure, as well is to add crumple zones designed to absorb the impact of more minor collisions. Although such advances work reasonably well for their intended purpose, these approaches add bulk and weight to the vehicle, which adversely affects fuel economy. Moreover, such advances are less effective in the event of side impacts, as side impacts may cause the floor structure of the vehicle to collapse inwardly below the passenger compartment, thereby increasing the risk of damage to the battery pack.

Although various systems over the years have been designed to disconnect electrical power from the battery in the event of a vehicle crash, such systems do not decrease the risk of a thermal runaway event, exhibited through extreme heat and fire, from spreading to the vehicle, thereby potentially causing harm to the vehicle occupants and first responders attempting to aid the occupants following a vehicle crash. The present disclosure addresses this concern.

SUMMARY OF THE DISCLOSURE

Embodiments of the present disclosure provide a mechanism for physically separating a high-voltage battery system from an electric vehicle in the event of a catastrophic event. One embodiment of the present disclosure provides electric vehicle battery pack release system configured to cause a physical separation of a battery pack from an electric vehicle on to which the battery pack is mounted, including one or more pyrotechnic bracket assembly configured to operably couple a battery pack to an electric vehicle, one or more sensor configured to sense a state of the electric vehicle, and an electronic control unit configured to receive data from the one or more sensors and to trigger an explosion in the one or more pyrotechnic bracket assemblies to affect the physical separation of the battery pack from the electric vehicle.

In one embodiment, the one or more pyrotechnic bracket assembly comprises a fastener, projectile and explosive charge. In one embodiment, upon activation the explosive charge is configured to rapidly expand to force the projectile into the fastener with a force sufficient to sever the fastener. In one embodiment, the one or more pyrotechnic bracket assembly is positionable in a space defined between a bottom of the chassis of the electric vehicle and a top of the battery pack.

In one embodiment, the one or more sensor is configured to sense at least one of impact damage, uncontrolled motion, or a battery thermal event. In one embodiment, the one or more sensor is configured to sense at least one of a temperature, pressure, voltage, amperage, or the presence of smoke, fumes or liquid within a battery tray of the battery pack. In one embodiment, the one or more sensor is at least one of a vehicle speed sensor, motion sensor, airbag sensor, seatbelt sensor, or battery sensor.

In one embodiment, the electronic control unit is configured to activate a plurality of pyrotechnic brackets in a sequential order to enable a natural force experienced by the vehicle to aid in physical separation of the battery pack from the electric vehicle.

Another embodiment of the present disclosure provides a pyrotechnic bracket assembly for selectively separating a battery pack from an electric vehicle, the pyrotechnic bracket assembly including a fastener operably coupling a battery pack to an electric vehicle, a projectile, and an explosive charge, whereupon activation the explosive charge is configured to rapidly expand to force the projectile into the fastener with a force sufficient to sever the fastener, thereby releasing the battery pack from the electric vehicle.

Another embodiment of the present disclosure provides a method of physically separating a battery pack from an electric vehicle in the event of a catastrophic event, the method including sensing a state of the electric vehicle, sending an activation signal to one or more pyrotechnic bracket assemblies operably coupling the battery pack to the electric vehicle, and severing a physical connection between the battery pack and the electric vehicle.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 1:
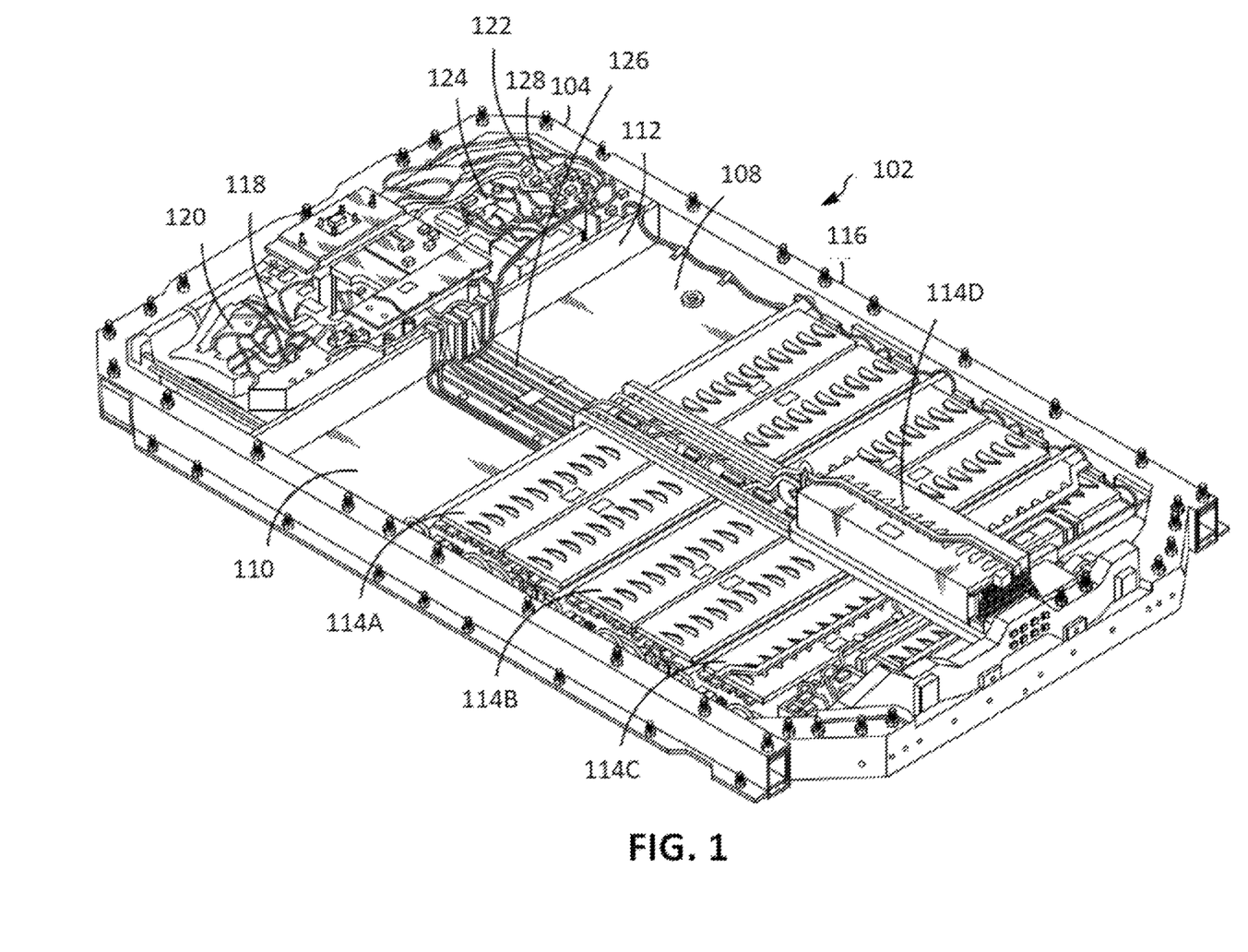
FIG. 1 is a perspective view depicting an electric vehicle battery pack operably coupleable to an electric vehicle via one or more mechanisms for physically separating the battery pack from the electric vehicle in the event of a catastrophic event, in accordance with embodiments of the disclosure.
Figure 4:
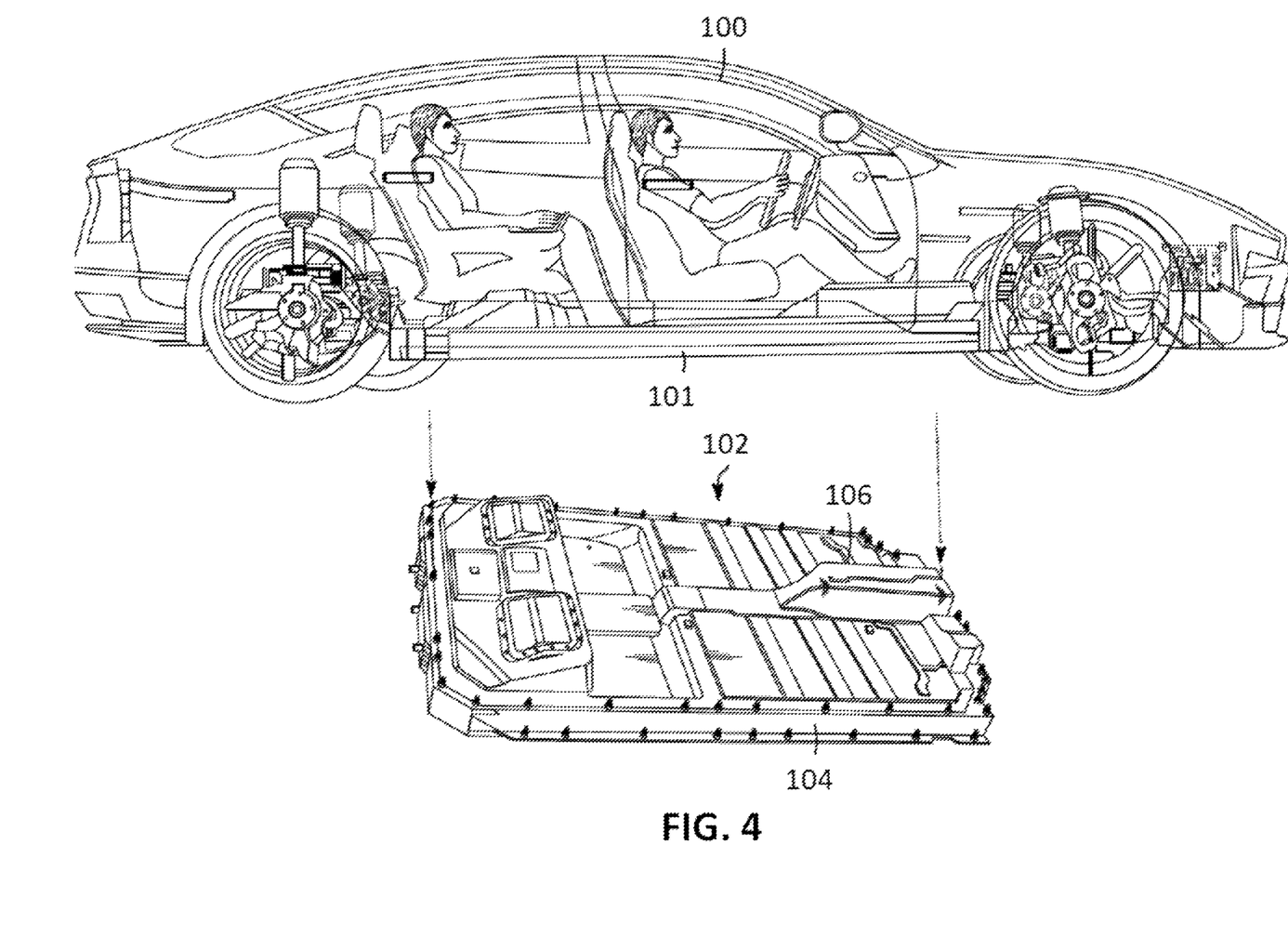
FIG. 4 is a perspective view depicting an electric vehicle and battery pack, wherein one or more pyrotechnic bracket assembly is activated, thereby releasing the battery pack from the electric vehicle, in accordance with an embodiment of the disclosure.

Referring to FIG. 1, an electric vehicle battery pack 102 operably coupled to an electric vehicle via one or more mechanisms for physically separating the battery pack 102 from the electric vehicle in the event of a catastrophic event, is depicted in accordance with embodiments of the disclosure. In embodiments, contents of the battery pack 102 can be contained within a battery tray 104 including a cover 106 (as depicted in FIG. 4), thereby creating a sealable battery cell compartment containing clusters of individual battery cells and other battery related components.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

As depicted, the battery tray 104 can represent a bottom and one or more sides of a structural vessel 108 defining a compartment 110. Further, in embodiments, the battery tray 104 can include one or more structural supports, such as cross members 112, which can provide structural support to the battery pack 102, as well as surfaces within the compartment 110 on which other components of the battery pack can be affixed.

As depicted, the individual battery cells are grouped into distinct clusters 114A-D (sometimes referred to as "battery modules"). In addition to the battery modules 114A-D, a variety of components can be packed into the compartment 110 before the cover 106 (as depicted in FIG. 1) is affixed to a top surface 116 of the battery tray 106, thereby sealing the compartment 110. In some embodiments, the components can include an electrical current transmission system 118, safety system 120, battery management system 122 (including current management system 124), and a battery bus bar 126 interconnecting the various components 114A-D, 120, 122, and 124. Once the components have been positioned within the compartment 110, the cover 106 can be affixed to the top surface 116 via a plurality of fasteners, adhesive, or a combination thereof.

In some embodiments, the battery management system 122 or other components of the multi-cell battery pack can include one or more sensors 128 for monitoring a physical state of the individual cells during operation. Such sensors include, but are not limited to measurement of temperature, pressure, voltage, amperage, and other ambient conditions (e.g., the presence of smoke or fumes, the presence of liquid, etc.) within the battery tray 104. Data from the sensors 128 can then be used by hardware and software to make intelligent decisions to control affect cooling and otherwise regulate a temperature of the individual cells.

It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 102 can exhibit thermal characteristics above a desired temperature range (e.g., above the maximum/not to exceed temperature), which may result in a failure (e.g., thermal runaway, etc.) of the individual cell. During such an occurrence, heat energy from the cell exhibiting the thermal characteristics can propagate into nearby and adjacent cells, thereby creating the potential for a chain reaction thermal event across multiple battery cells.

The battery pack 102 has many sources of heat which may contribute to abnormal thermal characteristics of any given cell (e.g., above a desired temperature range). The source of heat may be created internally (e.g., within the cells) or may originate from an external source (e.g., outside of the cell or battery tray 104). One internal heat source can occur when one or more individual cells experience a high rate of discharge, which may occur when the vehicle is under heavy acceleration and/or driving up a hill, etc. This type of internal heat is considered part of the normal operation of the vehicle, but is monitored for exceptional circumstances, which may occur during extremely hot weather or other predetermined or unforeseen circumstances. Abnormal thermal characteristics within an individual cell can also occur as a result of damage (e.g., impact, crushing, etc.), which can result in a thermal runaway.

The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use. In the event that a single cell experience an over temperature event, the heat produced by the overheated cell may transfer heat energy to adjacent cells (e.g., within a module 112) thereby raising the temperature of the adjacent cells to a point the propagation of the thermal event throughout the entire battery pack 102. For example, self-ignition of a battery cell may occur when the temperature of the cell reaches a temperature in a range of between about 120° C. and about 150° C.

To inhibit such a chain reaction thermal event, the battery pack 102 can be closely monitored and controlled to inhibit such thermal runaway of any single cell for the purpose of inhibiting a larger order thermal runaway, from the cell experiencing the over temperature conditions into adjacent cells, by various battery temperature regulation mechanisms. In rare cases where the battery temperature regulation mechanisms are insufficient to prevent a larger scale thermal runaway (e.g., spreading across multiple battery cells/modules), and onboard battery pack release system can be configured to cause a physical separation of the battery pack, thereby creating a physical distance between the battery pack experiencing the thermal event and the vehicle, for the purpose of inhibiting further damage to the vehicle and/or injury to the occupants thereof.

Figure 2:
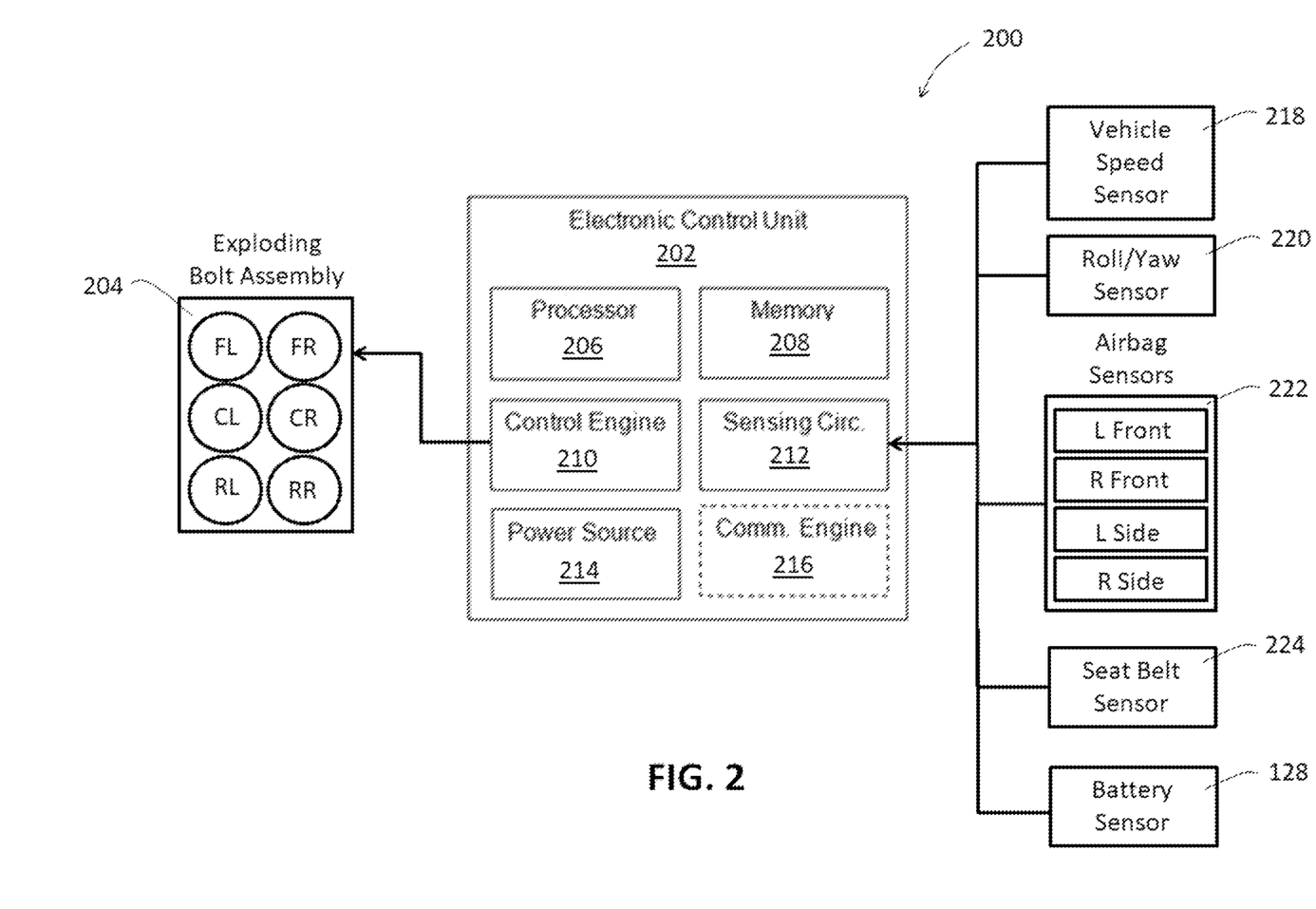
FIG. 2 is a schematic view depicting a battery pack release system configured to cause a physical separation of a battery pack from a vehicle on to which the battery pack is mounted in accordance with an embodiment of the disclosure.

Referring to FIG. 2, a battery pack release system 200 configured to cause a physical separation of the battery pack 102 from a vehicle on to which it is mounted, is depicted in accordance with an embodiment of the disclosure. In embodiments, the battery pack release system 200 can include an electronic control unit (ECU) 202 configured to receive data from one or more sensors (e.g., battery sensor 128, etc.) for the purpose of triggering one or more pyrotechnic bracket assemblies 204, thereby releasing or physically separating the battery pack 102 from the vehicle onto which it is mounted.

The ECU 202 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In some embodiments, ECU 202 can include a processor 206, memory 208, a control engine 210, sensing circuitry 212, and a power source 214. Optionally, in embodiments, ECU 202 can further include a communications engine 216. Processor 202 can include fixed function circuitry and/or programmable processing circuitry. Processor 202 can include any one or more of a microprocessor, a controller, a DSP, an ASIC, an FPGA, or equivalent discrete or analog logic circuitry. In some examples, processor 202 can include multiple components, such as any combination of one or more microprocessors, one or more controllers, one or more DSPs, one or more ASICs, or one or more FPGAs, as well as other discrete or integrated logic circuitry. The functions attributed to processor 206 herein may be embodied as software, firmware, hardware or any combination thereof.

Memory 208 can include computer-readable instructions that, when executed by processor 202 cause ECU 202 to perform various functions. Memory 208 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 210 can include instructions to control the components of ECU 202 and instructions to selectively control electrical power to the one or more pyrotechnic bracket assemblies 204. For example, based on conditions detected by sensing circuitry 212 or the vehicle (e.g. other vehicle ECUs), control engine 210 can selectively activate the one or more pyrotechnic bracket assemblies 204. In embodiments, the one or more pyrotechnic bracket assemblies 204 can include an explosive, which upon activation can generate a massive amount of harmless gas (e.g., nitrogen or argon), thereby causing a separation or physical decoupling of the battery pack 102 from the vehicle.

In embodiments, sensing circuitry 212 can be configured to sense one or more signals related to the current state of the vehicle, including whether the vehicle has been involved in an accident, sustained impact damage, is currently in uncontrolled motion, is experiencing a battery thermal event, etc. Accordingly, sensing circuitry 212 can include or can be operable with one or more sensors. For example, in some embodiments, the sensing circuitry 212 can include a vehicle speed sensor 218, one or more accelerometers or other type of motion sensor (e.g., a roll/yaw sensor 220), one or more airbag sensors 222, a seatbelt sensor 224, a battery sensor 128, and the like. Other types of sensors configured to sense a current state of the vehicle are also contemplated.

Accordingly, in some embodiments, the sensing circuitry 212 can monitor a speed and direction of travel of the vehicle (e.g., via sensors 218, 220). A collation or sudden impact can be sensed by the airbag sensors 222. Sudden stopping and other sudden accelerations can be sensed by the seatbelt sensor 224. The battery sensor 128 can be configured to sense temperature, pressure, voltage, amperage, and other ambient conditions (e.g., the presence of smoke or fumes, the presence of liquid, etc.) within the battery tray. Input from the sensors can be used by the ECU 202 to assess the current state of the vehicle.

In some embodiments, certain criteria detected by the sensors can trigger activation of the one or more bolt pyrotechnic bracket assemblies 204. For example, in some embodiments, the vehicle must be traveling at a defined speed (e.g., more than 25 km/h) prior to the system 200 been armed. Thereafter, a received signal from any of the airbag sensors 222 (which may be binary on/off) can trigger activation. In some embodiments, signals received from the airbag sensors can be verified or independently triggered by the sensor 220 or seatbelt sensor 222. Alternatively, in some embodiments, the system 200 can require the detection of a thermal event by battery sensor 128 prior to activating the one or more pyrotechnic bracket assemblies 204. An algorithm or logic rules requiring various combinations of sensor inputs prior to the activation of the one or more pyrotechnic bracket assemblies 204 is contemplated.

Power source 214 is configured to deliver operating power to the components of ECU 202. Power source 214 can include a battery and a power generation circuit to produce the operating power (e.g., the battery pack 102, individual battery cells, etc.). In some examples, the battery is rechargeable to allow extended operation. Power source 214 can include any one or more of a plurality of different battery types, such as lithium ion batteries.

Optionally, communications engine 216 can include any suitable hardware, firmware, software, or any combination thereof for communicating with other components of the vehicle and/or external devices (e.g., charging station, etc.). Under the control of processor 202, communication engine 216 can receive downlink telemetry from, as well as send uplink telemetry to one or more external devices using an internal or external antenna. In addition, communication engine 216 can facilitate communication with a networked computing device and/or a computer network.

Figure 3A:
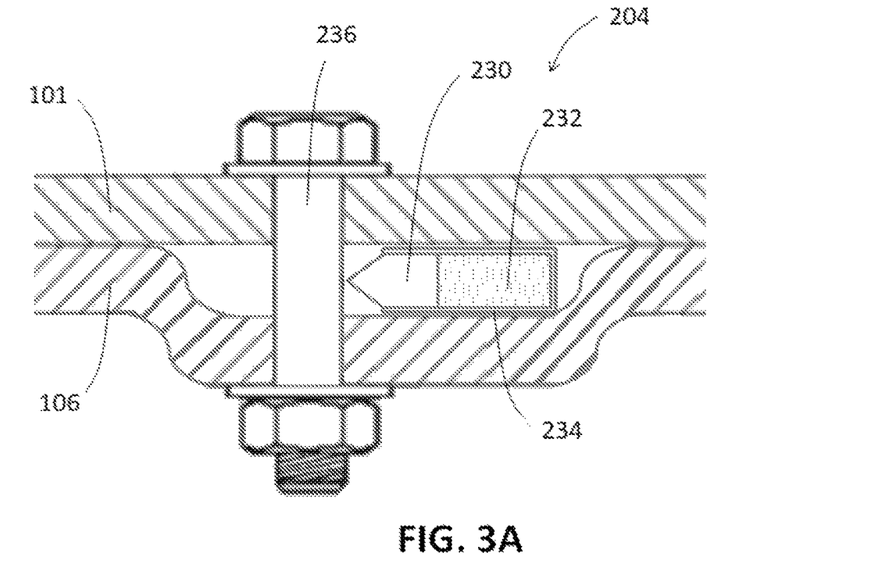
FIG. 3A is a partial, cross-sectional view of a pyrotechnic bracket in an initial, unactivated state, in accordance with an embodiment of the disclosure.
Figure 3B:
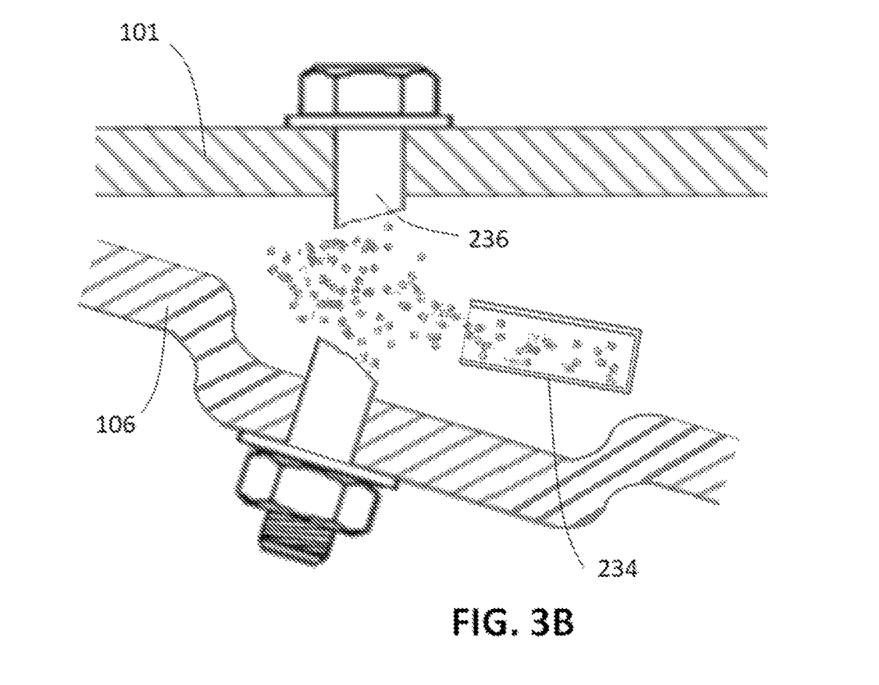
FIG. 3B is the pyrotechnic bracket of FIG. 3A in an activated state, in accordance with an embodiment of the disclosure.

With additional reference to FIGS. 3A-B, partial cross sectional views of a pyrotechnic bracket assembly 204 are depicted in accordance with an embodiment of the disclosure. Prior to activation (as depicted in FIG. 3A), the pyrotechnic bracket assembly 204 can include a projectile 230 and an explosive charge 232, which in some embodiments can be at least partially housed or contained within a casing or cartridge 234. In some embodiments, the cartridge 234 can be positioned between a bottom of the vehicle chassis 101 and a top or cover 106 of the battery pack 102. For example, in some embodiments, the cartridge 234 can reside within a small space or avoid defined between the vehicle chassis 101 and the battery pack 102. The projectile 230 can be positioned in proximity to a bolt or other fastener 236 operably coupling the battery pack 102 to the vehicle chassis 101, such that activation (e.g., explosion) of the explosive charge 232, which in some embodiments can be activated via an electric signal from the ECU 202, can cause the projectile 230 to sever or otherwise obliterate the fastener 236 (as depicted in FIG. 3B), thereby causing a separation of the battery pack 102 from the vehicle chassis 101.

With additional reference to FIG. 4, activation of the pyrotechnic bracket assembly 204 can cause the battery pack 102 to be released from the vehicle 100, thereby physically separating the battery pack 102, which has an increased likelihood of experiencing a thermal runaway. Accordingly, prior to activation, the battery pack 102 can be mounted to the frame and/or chassis 101 of the vehicle. Upon the detection of triggering criteria and/or a physical state of the vehicle (e.g., sudden external impact, detected battery pack thermal event, etc.), the system 200 can activate the one or more pyrotechnic bracket assemblies 204, thereby causing a separation of the battery pack 102 from the vehicle 100.

To promote a more controlled release of the battery pack 102 from the vehicle 100, in some embodiments, the ECU 202 can be configured to activate the one or more pyrotechnic bracket assemblies 204 and a particular order. For example, where one or more sensors 220 detect an abnormal roll or yaw, the one or more pyrotechnic bracket assemblies 204 associated with a trailing edge of the roll or yaw can be activated before the remaining bracket assemblies 204, thereby enabling a natural force experienced by the vehicle to aid in a physical separation of the battery pack 102 from the vehicle chassis 101. Other activation schemes among the one or more pyrotechnic bracket assemblies 204 are also contemplated.

The invention is further illustrated by the following embodiments: An electric vehicle battery pack release system configured to cause a physical separation of a battery pack from an electric vehicle on to which the battery pack is mounted, the system comprising: one or more pyrotechnic bracket assembly configured to operably couple a battery pack to an electric vehicle, one or more sensor configured to sense a state of the electric vehicle; and an electronic control unit configured to receive data from the one or more sensors and to trigger an explosion in the one or more pyrotechnic bracket assemblies to affect the physical separation of the battery pack from the electric vehicle.

A system or method according to any embodiment, wherein the one or more pyrotechnic bracket assembly comprises a fastener, projectile and explosive charge.

A system or method according to any embodiment, whereupon activation the explosive charge is configured to rapidly expand to force the projectile into the fastener with a force sufficient to sever the fastener.

A system or method according to any embodiment, wherein the projectile and an explosive charge are at least partially housed or contained within a casing or cartridge.

A system or method according to any embodiment, wherein the explosive charge is configured to rapidly generate nitrogen or argon, thereby causing a separation or physical decoupling of the battery pack from the vehicle.

A system or method according to any embodiment, wherein the one or more pyrotechnic bracket assembly is positionable in a space defined between a bottom of a chassis of the electric vehicle and a top of the battery pack.

A system or method according to any embodiment, wherein the one or more sensor is configured to sense at least one of impact damage, uncontrolled motion, or a battery thermal event.

A system or method according to any embodiment, wherein the one or more sensor is configured to sense at least one of a temperature, pressure, voltage, amperage, or the presence of smoke, fumes or liquid within a battery tray of the battery pack.

A system or method according to any embodiment, wherein the one or more sensor is configured to trigger an explosion in the one or more pyrotechnic bracket assemblies upon detection of a battery cell temperature in a range of between about 120° C. and about 150° C.

A system or method according to any embodiment, wherein the one or more sensor is at least one of a vehicle speed sensor, motion sensor, airbag sensor, seatbelt sensor, or battery sensor.

A system or method according to any embodiment, wherein the electronic control unit is configured to activate a plurality of pyrotechnic brackets in a sequential order to enable a natural force experienced by the vehicle to aid in physical separation of the battery pack from the electric vehicle.

A system or method according to any embodiment, wherein one or more pyrotechnic bracket assemblies associated with a trailing edge of a roll or yaw can be activated before a remaining number of bracket assemblies of the electric vehicle battery pack release system, thereby enabling a natural force experienced by the vehicle to aid in a physical separation of the battery pack from the vehicle chassis.

A system or method according to any embodiment, further comprising a communications engine.

An electric vehicle comprising the electric vehicle battery pack release system according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electric vehicle battery pack release system configured to cause a physical separation of a battery pack from an electric vehicle on to which the battery pack is mounted, the system comprising:
   one or more pyrotechnic bracket assemblies configured to operably couple the battery pack to the electric vehicle;
   one or more sensor configured to sense a state of the electric vehicle; and
   an electronic control unit configured to receive data from the one or more sensors and to trigger an explosion in the one or more pyrotechnic bracket assemblies to affect the physical separation of the battery pack from the electric vehicle, whereupon activation of an explosive charge is configured to rapidly expand to force a projectile into a fastener with a force sufficient to sever the fastener.

2. The electric vehicle battery pack release system of claim 1, wherein the one or more pyrotechnic bracket assembly comprises the fastener, projectile and explosive charge.

3. The electric vehicle battery pack release system of claim 1, wherein the one or more pyrotechnic bracket assembly is positionable in a space defined between a bottom of a chassis of the electric vehicle and a top of the battery pack.

4. The electric vehicle battery pack release system of claim 1, wherein the one or more sensor is configured to sense at least one of impact damage, uncontrolled motion, or a battery thermal event.

5. The electric vehicle battery pack release system of claim 1, wherein the one or more sensor is configured to sense at least one of a temperature, pressure, voltage, amperage, or a presence of smoke, fumes or liquid within a battery tray of the battery pack.

6. The electric vehicle battery pack release system of claim 1, wherein the one or more sensor is at least one of a vehicle speed sensor, motion sensor, airbag sensor, seatbelt sensor, or battery sensor.

7. The electric vehicle battery pack release system of claim 1, wherein the electronic control unit is configured to activate a plurality of pyrotechnic brackets in a sequential order to enable a natural force experienced by the vehicle to aid in physical separation of the battery pack from the electric vehicle.

8. A pyrotechnic bracket assembly for selectively separating a battery pack from an electric vehicle, the pyrotechnic bracket assembly comprising:
   a fastener operably coupling the battery pack to the electric vehicle;
   a projectile; and
   an explosive charge, whereupon activation of the explosive charge is configured to rapidly expand to force the projectile into the fastener with a force sufficient to sever the fastener, thereby releasing the battery pack from the electric vehicle.

9. The pyrotechnic bracket assembly of claim 8, wherein the pyrotechnic bracket assembly is positionable in a space defined between a bottom of a chassis of an electric vehicle and a top of a battery pack.

10. The pyrotechnic bracket assembly of claim 8, further comprising a sensor configured to sense at least one of impact damage, uncontrolled motion, or a battery thermal event.

11. The pyrotechnic bracket assembly of claim 10, wherein the one or more sensor is at least one of a vehicle speed sensor, motion sensor, airbag sensor, seatbelt sensor, or battery sensor.

12. The pyrotechnic bracket assembly of claim 8, further comprising a sensor configured to sense at least one of a temperature, pressure, voltage, amperage, or the presence of smoke, fumes or liquid within a battery tray of the battery pack.

13. The pyrotechnic bracket assembly of claim 8, further comprising an electronic control unit configured to activate a plurality of pyrotechnic brackets in a sequential order to enable a natural force experienced by the electric vehicle to aid in physical separation of the battery pack from the electric vehicle.

14. A method of physically separating a battery pack from an electric vehicle in the event of a catastrophic event, the method comprising:
sensing a state of the electric vehicle;
sending an activation signal to one or more pyrotechnic bracket assemblies operably coupling the battery pack to the electric vehicle; and
severing a physical connection between the battery pack and the electric vehicle, wherein the physical connection is severed by the one or more pyrotechnic bracket assemblies comprising a fastener, projectile and explosive charge.

15. The method of claim 14, wherein the one or more pyrotechnic bracket assembly is positionable in a space defined between a bottom of the chassis of the electric vehicle and a top of the battery pack.

16. The method of claim 14, wherein the sensed state comprises at least one of impact damage, uncontrolled motion, or a battery thermal event.

17. The method of claim 14, wherein the sensed state comprises at least one of a temperature, pressure, voltage, amperage, or a presence of smoke, fumes or liquid within a battery tray of the battery pack.

18. The method of claim 14, wherein the sensed state comprises, further comprising activating severing a plurality of physical connections in a sequential order to enable a natural force experienced by the electric vehicle to aid in physical separation of the battery pack from the electric vehicle.

* * * * *